United States Patent [19]
Cozzolino et al.

[11] 3,867,973
[45] Feb. 25, 1975

[54] PNEUMATIC TIRE WITH EMBEDDED RING MEANS

[75] Inventors: Henry Cozzolino; Robert L. Gastineau, both of Dayton, Ohio

[73] Assignee: United Aircraft Products, Inc., Dayton, Ohio

[22] Filed: Jan. 30, 1973

[21] Appl. No.: 328,070

[52] U.S. Cl. .................................. 152/153, 152/330
[51] Int. Cl. .............................................. B60c 9/00
[58] Field of Search .......................... 152/153, 330

[56] References Cited
UNITED STATES PATENTS
2,368,974  2/1945  Dietz .................................... 152/153
2,902,072  9/1959  Reuter .............................. 152/33 D
3,515,195  6/1970  Sperberg ......................... 152/330 X

FOREIGN PATENTS OR APPLICATIONS
290,462  5/1928  Great Britain ................... 152/33 D Primary Examiner—Robert J. Spar
Assistant Examiner—George F. Abraham
Attorney, Agent, or Firm—J. E. Beringer

[57] ABSTRACT

A pneumatic tire in which ring elements, as for example hollow metallic O-rings, are installed in bead or tread portions of the tire or both to serve reinforcement and/or cooling functions. In the tread area the ring elements operate in conjunction with tread perforations for a rapid distribution and rejection of heat as generated in an aircraft tire or the like.

11 Claims, 7 Drawing Figures

PATENTED FEB 25 1975　　3,867,973

PNEUMATIC TIRE WITH EMBEDDED RING MEANS

BACKGROUND OF THE INVENTION

This invention relates to pneumatic tires and particularly to tires structured for an advantageous use of ring means for reinforcement and/or cooling purposes.

A tire is a pressure vessel, the weight of a supported vehicle being sustained by air pressure within the tire. Since the tire is comprised in large part of rubber or rubber-like material the diameter at the rim tends to expand under inflation. If uncontrolled, such expansion will lead to air leakage around the wheel rim. It has accordingly been known to imbed in the bead portion of the tire a hoop, usually made of coiled or twisted wire, of sufficient strength to carry the pressure load in the tire. Hoop devices of the prior art have certain disadvantages. For example, if made heavy and strong to sustain relatively high internal pressures, mounting of the tire on a rim may be difficult. If made more slender and weaker they are subject to overstress and fracture. The prior art hoop varies in cross section and so does not carry the supported load uniformly, providing a basis for localized stress and fracture. It makes no specific provision for cooling, nor does it offer a means to interact with the material of the tire inherently and positively to anchor the hoop in place, when that may be found desirable. On the other hand, an interflow of tire material around strands of the hoop restricts relative rotary adjustment of the hoop about its own axis, as may under some conditions be found desirable to avoid distortion.

In the prior art the tire tread area is conventionally left unsupported and has no means for rapid heat dissipation and distribution. The latter is a deficiency of particular meaning in aircraft usage where an impacted portion of a tire, on landing, absorbs large amounts of heat energy.

SUMMARY OF THE INVENTION

The instant invention has in view a pneumatic tire making use of ring means in either or both of its bead and tread portions. The ring or ring elements are symmetrical in cross section and uniform throughout their circumference. In one embodiment thereof a ring element is hollow and radially apertured for a free circulation of air interiorly thereof and the tire itself may be perforated to communicate the ring interior continuously with ambient surroundings. At least some of the ring apertures may be used as points of penetration by the tire material, as during the molding process, in order positively to position the ring in a rotary sense. According to one invention aspect the ring element is a hollow metallic ring of toroidal configuration although a use of other materials, both organic and inorganic, and of other cross sectional shapes are possible and contemplated.

To provide a pneumatic tire characterized substantially as in the foregoing is a general object of the invention.

Other objects and structural details of the invention will appear from the following description, when read in connection with the accompanying drawings, wherein.

Figure 1:
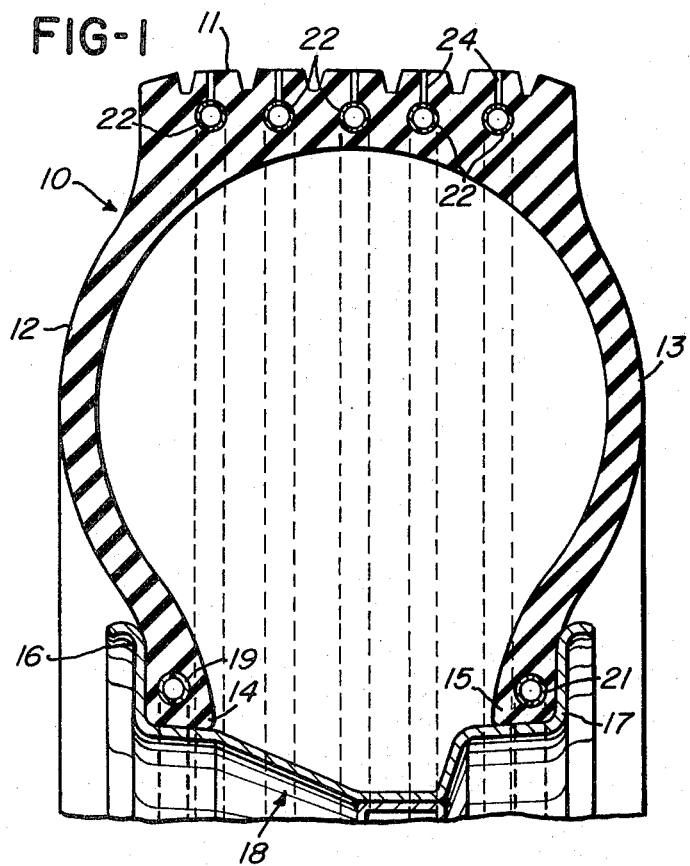
FIG. 1 is a view in cross section, partly diagrammatic, of a pneumatic tire in accordance with an illustrated embodiment of the invention mounted on a wheel rim.
Figure 2:
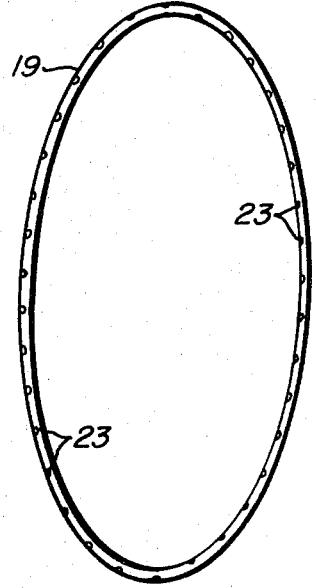
FIG. 2 is a perspective of a ring element as installed in the tire of FIG. 1.
Figure 3:
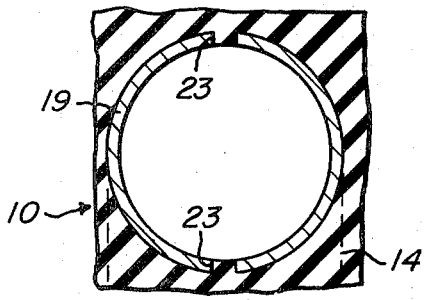
FIG. 3 is an enlarged cross sectional view of a ring element as installed in the bead portion of the tire showing the manner in which vent holes in the ring may be used to anchor the ring relatively to the tire.
Figure 4:
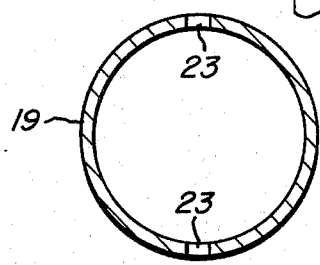
FIG. 4 is a detail view in cross section through the ring element of FIG. 2.

Referring to the drawings, a pneumatic tire in accordance with the illustrated embodiment of the invention comprises a tire body 10 of a generally conventional configuration in that it provides a tread portion 11, inner and outer side walls 12 and 13, and, at extremities of the walls 12 and 13, bead portions 14 and 15. The latter are received within flaring flange portions 16 and 17 of a wheel rim 18. Installed in the bead portion 14, as by being embedded therein in the molding process, is a ring element 19. A like element 21 is similarly installed in bead portion 15. A series of horizontally aligned ring elements 19 and 21, are installed in the tread portion 11. All ring elements 19 to 22 are continuous in a circumferential sense and extend completely around the tire. In the illustrated instance they have the character of hollow metallic O-rings and further in accordance with the illustrated instance have radial apertures 23 capable of venting the hollow interiors or of providing anchor points for locating the rings relatively to the tire, or both. The apertures 23 are spaced apart circumferentially of one another around the ring element and are disposed at inner and outer peripheries of the ring, as shown in FIG. 4, or otherwise as may be found desirable. In performing a locating function, the apertures 23 become extrusion or like openings through which, as shown in FIG. 3, material from the tire body is caused to flow in the molding process. The ring element is as a result positively locked to the tire body when positive anchoring of the ring may be found desirable or necessary.

The O-ring elements 19 through 22 have a substantially uniform cross sectional configuration, in the present instance toroidal. They are or may be, smooth surfaced and in the absence of apertures 23 define strong but light weight hoop elements uniform in diameter for a uniform application of load and capable of relative rotary self-adjustment should this be desirable or necessary to avoid distortion.

The ring elements may be made of any desired material, organic or inorganic, and may assume cross sectional shapes other than the toroidal shape illustrated, for example, rectangular, oval, triangular and the like. Further, and with particular reference to the hoop elements 19 and 21, the rings may be twisted to provide irregular surfaces interacting with the material of the tire body.

The ring elements are essentially self-cooling in that air in excessively heated portions of their interiors may be readily displaced into other portions with cooling effect. Moreover, while basically strong, the ring elements are thin walled and transmit heat readily around their circumferential areas.

The ring elements 22 have a reinforcing function at the tread 11 and may be provided in such size and number as to serve a supporting function in conjunction with or independently of tire pressurization. In an important aspect thereof, however, the ring elements 22 perform a cooling function at the tread where under some operating conditions temperatures may rise to substantial values. Portions of the tire tread may further be subject to localized quickly rising temperatures, as in the case of aircraft tires upon landing. Thus, and in the illustrated instance, the tread portion 11 is formed with a series of radial perforations 24 extending from the outer tread surface inwardly thereof to the tube elements 22. If desired, the openings 24 may be drilled or otherwise formed in an operation terminating in the formation of an aperture 23 in the ring element thereby to insure a through line of communication from the ring interiors to the tire body exterior at the tread surface. Heat at the tread portion is absorbed into the ring elements and dissipated thereby quickly to cooler parts of the tire circumference. The openings 24 act as air flow passages and the rotation of the tire over ground surface may accomplish a pumping-like action in which air is forced to and from the ring interiors through the apertures 23 therein and through the tire body openings 24.

In case of loss of air pressure in the tire during operation, the ring elements 22 provide a safety factor, allowing the vehicle to be controlled until it can be stopped.

Figure 7:
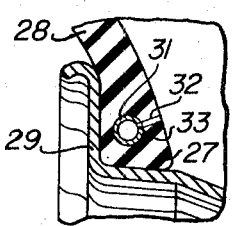
FIG. 7 is a fragmentary view of a tire bead portion showing a further modified form of embedded ring means.
Figure 5:
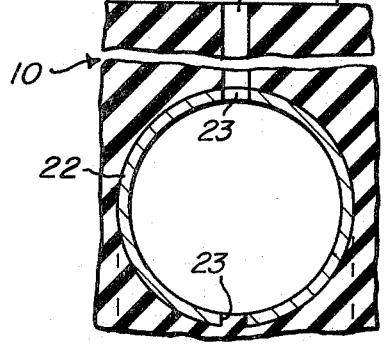
FIG. 5 is a detail enlarged view of a portion of the tread of FIG. 1, showing the manner in which the installed ring communicates with ambient surroundings through the tread surface.

The cooling concept contemplated through use of the tread openings 24 may be applicable also to the bead portions by drilling from the tire body exterior into the ring elements 19 and 21. The wall portions 12 and 13 are subject to considerable flexing in the operation of a vehicle and the generated forces may be used to pump air into and out of the bead hoops as represented by rings 19 and 21. Similarly, a drilling through the bead portions from the tire interior may provide a means of pressurizing the interiors of ring elements 19 and 21 to maintain their uniformity of cross section and impart strength thereto while allowing the ring elements to be made thin for greater heat conductivity and ease of flexing. Thus, the ring elements can be made relatively thin and flexible to simplify mounting and dismounting of a tire relatively to the wheel rim and then assume upon inflation of the tire a relatively rigid character assisting it in the performance of its hoop function. The described construction is shown in FIG. 7 where a bead portion 27 of a tire 28 is shown mounted to a rim 29. A hollow metallic O-ring 31 is embedded in the bead portion 27, substantially in the manner of ring 19. By a drilling or like process, aligning tire and ring openings, 32 and 33 respectively, communicate the ring interior with the pressurized or pressurizable tire interior.

Figure 6:
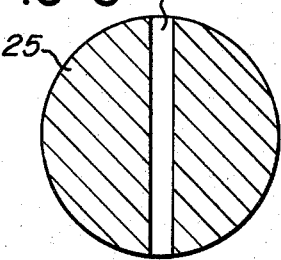
FIG. 6 is a view like FIG. 4, showing a modified form of embedded ring means.

In FIG. 6 is shown a hoop member 25 solid in construction and radially recessed by means of a drilled opening 26. In the molding process, tire materials flow into the drilled opening 26, anchoring the hoop member 25 in place in the tire.

The invention has been disclosed with reference to particular structural embodiments. Modifications have been discussed and these and others obvious to a person skilled in the art to which the invention relates are considered to be within the intent and scope of the invention.

What is claimed is:

1. In a pneumatic tire having tread, side wall and bead portions, ring-like means unitarily contained in one or more portions circumferentially of the tire for reinforcement and/or cooling purposes, said ring-like means including one or more hollow ring elements in the body of the tire near the tread portion, each of said elements having vent holes therein some of which define a means providing for a flow of tire material into said ring element for anchoring purposes and others thereof providing for air flow to and from the ring element interior, said tire having its tread portion perforated to provide continuing air flow passages from the tread surface to and from the interior of said ring element.

2. A pneumatic tire according to claim 1, characterized in that there is provided in the tread portion of the tire a plurality of said ring elements in a horizontal row.

3. In a pneumatic tire having tread, side wall and bead portions, said tire having surfaces respectively defining the tire interior and exterior, ring-like means unitarily contained in one or more portions circumferentially of the tire for reenforcement and/or cooling purposes, said ring-like means including a ring element uniform in cross section and having a continuous hollow interior, the tire and ring element having aperture means communicating the ring element interior through one surface only of a portion of the tire said one surface being the wall of a pressurized portion of the interior of the tire for an internal pressurization of said ring element in conjunction with inflation of the tire.

4. In a pneumatic tire having tread, side wall and bead portions, a hollow metallic O-ring unitarily contained in one or more portions circumferentially of the tire for reenforcement and/or cooling purposes.

5. A pneumatic tire according to claim 4 wherein said O-ring has vent holes acting as a means providing for a flow of tire material into said O-ring at circumferentially spaced locations to anchor the O-ring relatively to the tire.

6. A pneumatic tire according to claim 4, wherein said hollow metallic O-ring is in a bead portion of the tire.

7. A pneumatic tire according to claim 4, wherein said hollow metallic O-ring is in a tread portion of the tire.

8. A pneumatic tire according to claim 4, wherein hollow metallic O-rings are in both bead and tread portions of the tire.

9. A pneumatic tire according to claim 4 said tire having surfaces respectively defining the tire interior and exterior, aperture means in said tire opening through one only of said surfaces, and said O-ring having vent holes to communicate through said aperture means with the tire interior or exterior.

10. A pneumatic tire according to claim 9 an interior portion of the tire being pressurized in use, wherein aperture means in said tire opens to a pressurized portion of the tire interior for an internal pressurization of said O-ring in conjunction with inflation of the tire.

11. In a pneumatic tire having tread, side wall and bead portions, ring-like means unitarily contained in one or more portions circumferentially of the tire for reenforcement and/or cooling purposes, said ring-like means including a ring element uniform in cross section and having a continuous hollow interior, said ring element having vent holes acting as a means providing for a flow of tire material into said ring element at circumferentially spaced locations to anchor the ring element relatively to the tire.

* * * * *